United States Patent
Yu et al.

(10) Patent No.: US 10,256,744 B2
(45) Date of Patent: Apr. 9, 2019

(54) CONTROLLER DEVICE WITH ADAPTIVE SYNCHRONOUS RECTIFICATION

(71) Applicant: Infineon Technologies Austria AG, Villach (AT)

(72) Inventors: Weifu Yu, Singapore (SG); Tong Bao, Singapore (SG); Ming Ping Mao, Singapore (SG); Yaw Hann Thian, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 12 days.

(21) Appl. No.: 15/702,347

(22) Filed: Sep. 12, 2017

(65) Prior Publication Data
US 2019/0081547 A1    Mar. 14, 2019

(51) Int. Cl.
*H02M 7/48*    (2007.01)
*H02M 1/088*    (2006.01)
(Continued)

(52) U.S. Cl.
CPC ......... *H02M 7/4826* (2013.01); *H02M 1/088* (2013.01); *H02M 3/33553* (2013.01);
(Continued)

(58) Field of Classification Search
CPC ............. H02M 1/088; H02M 3/33553; H02M 2001/0054; H02M 3/33592;
(Continued)

(56) References Cited

U.S. PATENT DOCUMENTS 6,151,233 A    11/2000  Kondo
6,930,893 B2    8/2005  Vinciarelli
(Continued)

FOREIGN PATENT DOCUMENTS

WO    2013106095 A1    7/2013

OTHER PUBLICATIONS

"FAN6208 Datasheet: Secondary-Side Synchronous Rectifier Controller for LLC Topology," Fairchild Semiconductor, Jun. 2013, 18 pp.
(Continued)

*Primary Examiner* — Gary L Laxton
*Assistant Examiner* — Demetries A Gibson
(74) *Attorney, Agent, or Firm* — Shumaker & Sieffert, P.A.

(57) ABSTRACT

In an example, a controller device for a resonant converter includes processing circuitry configured to output a first switching signal and a second switching signal. A switching module is configured to electrically couple a primary side winding of a transformer to a voltage source during an activated state of the first switching signal and to electrically couple the primary side winding to a reference node during an activated state of the second switching signal. The processing circuitry is further configured to determine a first synchronous rectification signal and a second synchronous rectification signal. A synchronous rectification module is configured to generate a first channel for a first secondary side winding of the transformer during an activated state of the first synchronous rectification signal and to generate a second channel for a second secondary side winding of the transformer during an activated state of the second synchronous rectification signal.

15 Claims, 10 Drawing Sheets

(51) Int. Cl.
*H02M 3/335* (2006.01)
*H02M 1/00* (2006.01)
*H02M 1/42* (2007.01)

(52) U.S. Cl.
CPC .. *H02M 1/4241* (2013.01); *H02M 2001/0054* (2013.01); *H02M 2001/0058* (2013.01); *H02M 2007/4811* (2013.01); *H02M 2007/4815* (2013.01)

(58) Field of Classification Search
CPC ............ H02M 3/3376; H02M 1/4241; H02M 7/4826; H02M 2007/4815; H02M 2007/4811; H02M 2001/0058
See application file for complete search history.

(56) References Cited

U.S. PATENT DOCUMENTS

| | | | |
|---|---|---|---|
| 9,780,635 B1* | 10/2017 | Lam | H02M 1/00 |
| 9,998,021 B2* | 6/2018 | Chang | H02M 3/33592 |
| 2003/0142513 A1 | 7/2003 | Vinciarelli | |
| 2008/0298093 A1 | 12/2008 | Jin et al. | |
| 2009/0016083 A1 | 1/2009 | Soldano et al. | |
| 2009/0097280 A1 | 4/2009 | Wu et al. | |
| 2010/0067262 A1* | 3/2010 | Chen | H02M 3/33592 363/21.06 |
| 2010/0067275 A1 | 3/2010 | Wang et al. | |
| 2010/0188871 A1 | 7/2010 | Kim et al. | |
| 2011/0090725 A1 | 4/2011 | Lu | |
| 2011/0107122 A1 | 5/2011 | Wang et al. | |
| 2013/0163290 A1* | 6/2013 | Moon | H02M 3/33592 363/21.02 |
| 2014/0016361 A1 | 1/2014 | Weis et al. | |
| 2014/0098574 A1 | 4/2014 | Hara et al. | |
| 2014/0198536 A1* | 7/2014 | Fu | H02M 3/33546 363/17 |
| 2014/0334188 A1* | 11/2014 | Jitaru | H02M 3/33576 363/16 |
| 2015/0124487 A1* | 5/2015 | Fu | H02M 3/33569 363/17 |
| 2015/0124492 A1* | 5/2015 | Fu | H02M 3/33546 363/21.02 |
| 2015/0171750 A1 | 6/2015 | Zeng et al. | |
| 2016/0013714 A1 | 1/2016 | Young | |
| 2016/0094137 A1* | 3/2016 | Jitaru | H02M 3/3353 363/21.03 |
| 2016/0209855 A1 | 7/2016 | Deboy | |
| 2016/0218634 A1 | 7/2016 | Du et al. | |
| 2016/0294298 A1* | 10/2016 | Wong | H02M 3/33592 |
| 2016/0352231 A1* | 12/2016 | Quigley | H02M 3/33507 |
| 2017/0126133 A1* | 5/2017 | Yang | H02M 3/33507 |
| 2017/0358994 A1* | 12/2017 | Ueno | H02M 1/10 |
| 2018/0062530 A1* | 3/2018 | Kong | H02M 1/08 |
| 2018/0115252 A1* | 4/2018 | Chang | H02M 3/33592 |
| 2018/0159436 A1* | 6/2018 | Wang | H02M 1/088 |
| 2018/0198374 A1* | 7/2018 | Jitaru | H02M 3/33592 |
| 2018/0248489 A1* | 8/2018 | Wang | H02M 7/217 |
| 2018/0278169 A1* | 9/2018 | Jitaru | H02M 3/33592 |

OTHER PUBLICATIONS

"SRK2000A Datasheet: Synchronous rectifier smart driver for LLC resonant converter," STMicroelectronics, May 2017, 19 pp.
"TEA1995T Datasheet: GreenChip dual synchronous rectifier controller," NXP Semiconductors, Rev. 2, Nov. 2016, 18 pp.

* cited by examiner

CONTROLLER DEVICE WITH ADAPTIVE SYNCHRONOUS RECTIFICATION

TECHNICAL FIELD

This disclosure relates to resonant mode power converters, such as LLC (inductor-inductor-capacitor) power converter circuits.

BACKGROUND

A resonant mode power converter circuit may include a half-bridge circuit with two switches. A controller device for the resonant mode power converter circuit may switch the two switches at a switching frequency based on an output voltage of the resonant mode power converter circuit. To increase the output voltage, the controller device may decrease the switching frequency, and to decrease the output voltage, the controller device may increase the switching frequency. Additionally, synchronous rectifiers may be used to rectify the output voltage of the resonant mode power converter circuit.

SUMMARY

This disclosure describes techniques for adaptive synchronous rectification. A controller device for a resonant mode power converter circuit may determine one or more synchronous rectification signals using the current at a primary side winding of the resonant mode power converter circuit. In this way, a controller device of the resonant mode power converter circuit may generate the one or more synchronous rectification signals to reduce an amount of current flowing through a body diode of a synchronous rectifier.

In some examples, this disclosure describes a controller device for a resonant converter. The controller device includes processing circuitry configured to output a first switching signal and a second switching signal to a switching module. The switching module is configured to electrically couple a primary side winding of a transformer to a voltage source during an activated state of the first switching signal and to electrically couple the primary side winding of the transformer to a reference node during an activated state of the second switching signal. The processing circuitry is further configured to receive an indication of a current at the primary side winding and determine, using the indication of the current at the primary side winding, a first synchronous rectification signal and a second synchronous rectification signal for activating a synchronous rectification module. The synchronous rectification module is configured to generate a first channel for current to flow from a first secondary side winding of the transformer to a load during an activated state of the first synchronous rectification signal and to generate a second channel for current to flow from a second secondary side winding of the transformer to the load during an activated state of the second rectification signal. The processing circuitry is further configured to output the first synchronous rectification signal and the second synchronous rectification signal to the synchronous rectification module.

In some examples, a method for voltage regulation includes outputting a first switching signal and a second switching signal to a switching module. The switching module is configured to electrically couple a primary side winding of a transformer to a voltage source during an activated state of the first switching signal and to electrically couple the primary side winding of the transformer to a reference node during an activated state of the second switching signal. The method further includes receiving an indication of a current at the primary side winding, determining, using the indication of the current at the primary side winding, a first synchronous rectification signal and a second synchronous rectification signal for activating a synchronous rectification module, and outputting the first synchronous rectification signal and the second synchronous rectification signal to the synchronous rectification module. The synchronous rectification module is configured to generate a first channel for current to flow from a first secondary side winding of the transformer to a load during an activated state of the first synchronous rectification signal and to generate a second channel for current to flow from a second secondary side winding of the transformer to the load during an activated state of the second synchronous rectification signal.

In some examples, a circuit for voltage regulation includes a transformer, a sensor module, a controller device, a switching module, and a synchronous rectification module. The transformer includes a primary side winding, a first secondary side winding, and a second secondary side winding. The sensor module is configured to generate an indication of a current at the primary side winding. The controller device includes processing circuitry configured to output a first switching signal and a second switching signal, determine, using the indication of the current at the primary side winding, a first synchronous rectification signal and a second synchronous rectification signal, and output the first synchronous rectification signal and the second synchronous rectification signal. The switching module is configured to electrically couple the primary side winding to a voltage source during an activated state of the first switching signal and to electrically couple the primary side winding to a reference node during an activated state of the second switching signal. The synchronous rectification module is configured to generate a first channel for current to flow from the first secondary side winding to a load during an activated state of the first synchronous rectification signal and to generate a second channel for current to flow from the second secondary side winding to the load during an activated state of the second synchronous rectification signal.

The details of one or more examples are set forth in the accompanying drawings and the description below. Other features, objects, and advantages will be apparent from the description and drawings, and from the claims.

DETAILED DESCRIPTION

A resonant mode power converter circuit, for example an inductor (L), inductor (L), capacitor (C), collectively "LLC," resonant converter, may convert an input voltage to an output voltage to power an output load. To maintain a stable output voltage, a controller device may deliver control signals at a variable switching frequency to switches in a half-bridge circuit of the resonant mode power converter circuit. The controller device may adjust the switching frequency in response to changes in the input voltage and/or changes in the impedance of the output load. Additionally, to reduce losses, synchronous rectifiers may be used to replace diodes used for rectifying the output voltage. Synchronous rectifiers may be "turned-on" or activated to correspond to when a diode would conduct to reduce power for rectifying the output voltage compared to a circuit that use diodes for rectifying the output voltage.

To generate a synchronous rectification signal for activating a synchronous rectifier, some systems may use a synchronous rectification (SR) controller that is separate from a controller device for switching a resonant mode power converter circuit. More specifically, for example, a SR controller may be located at a LLC secondary side, to control a SR metal-oxide-semiconductor field effect transistor (MOSFET) on and off. This LLC SR solution uses voltage monitoring across the SR MOSFET to determine the SR MOSFET on and off. However, voltage monitoring across the SR MOSFET may result in lower power conversion efficiency when the SR MOSFET is turned-off too early, which is mainly caused by the additional voltage drop across the parasitic inductance.

Rather than relying on a separate SR controller, a controller device for switching a resonant mode power converter circuit may control a synchronous rectification module. Moreover, rather than relying on voltage monitoring across the SR MOSFET to determine the SR MOSFET on and off, the controller device may use a current at a primary side winding of the resonant mode power converter circuit to reduce power lost in a synchronous rectifier compared to systems that do not use a current at a primary side winding.

Figure 1:
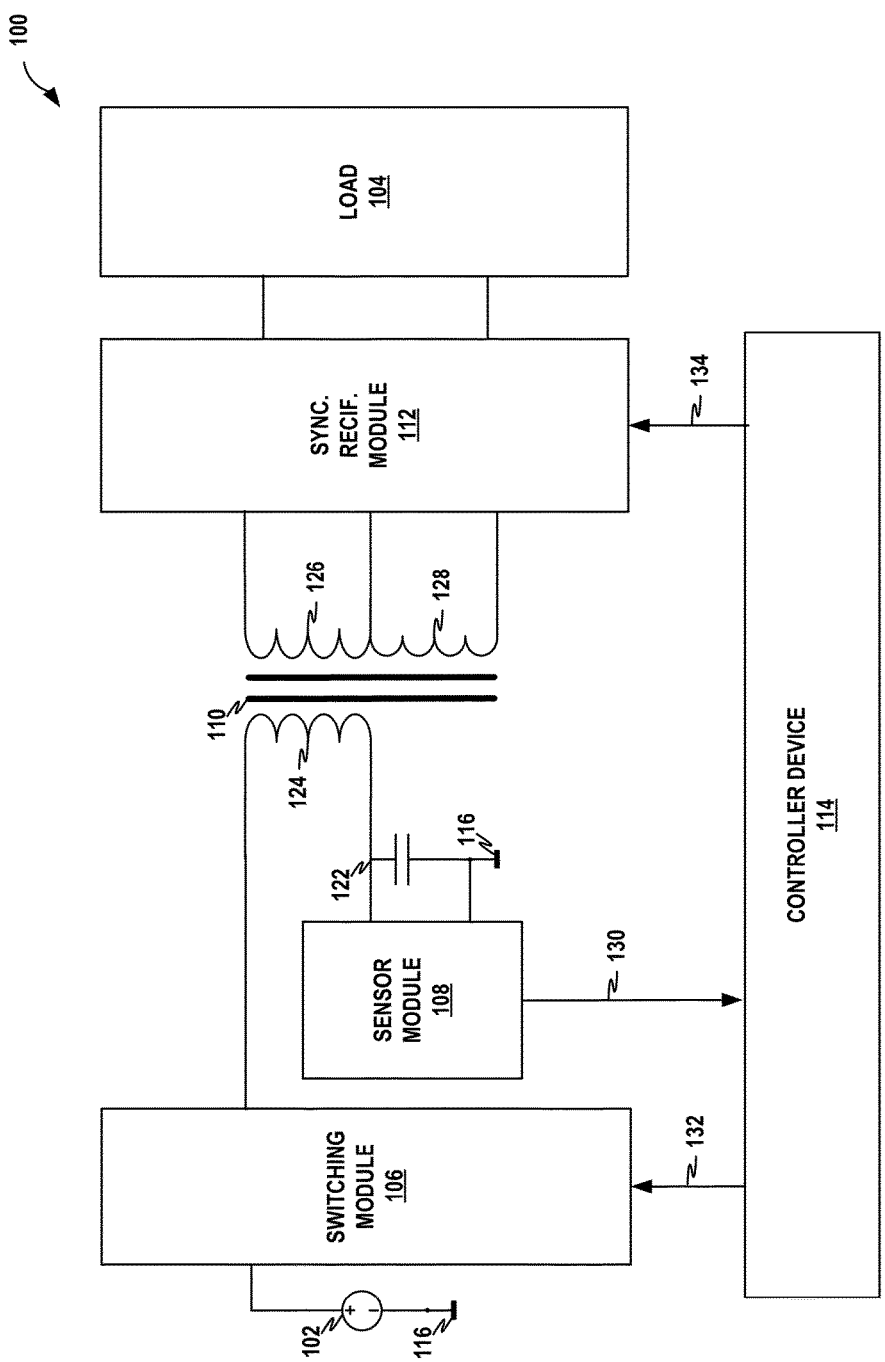
FIG. 1 is a block diagram illustrating an example system configured for adaptive synchronous rectification, in accordance with one or more techniques of this disclosure.

FIG. 1 is a block diagram illustrating an example system 100 configured for adaptive synchronous rectification, in accordance with one or more techniques of this disclosure. As shown system 100 may include voltage source 102, load 104, switching module 106, sensor module 108, transformer 110, synchronous rectification module 112, controller device 114, reference node 116, and capacitor 122. Examples of a reference node 116 may include, but are not limited to, an earth ground, ground plane, chassis ground, signal ground, a reference node not associated with a ground, or another reference node. System 100 may include additional components. For example, a pulse transformer (or high-speed opto-coupler) may be used to transfer isolated SR gate signals (e.g., one or more synchronous rectification signals 134) from controller device 114 to drive synchronous rectification module 112.

Voltage source 102 may be configured to provide electrical power to one or more other components of system 100. For instance, voltage source 102 may be configured to supply an input power to load 104. In some examples, voltage source 102 may be a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, voltage source 102 may be an output of a power converter. For instance, voltage source 102 may be an output of a direct current (DC) to DC power converter, an alternating current (AC) to DC power converter, and the like. In some examples, voltage source 102 may represent a connection to an electrical supply grid. In some examples, the input power signal provided by voltage source 102 may be a DC input power signal. For instance, voltage source 102 may be configured to provide a DC input power signal in the range of ~5 VDC to ~40 VDC.

Load 104 may be any suitable device configured to use power output by synchronous rectification module 112. In some examples, load 104 may include an electronic device. Examples of electronic devices may include, but are not limited to, mobile devices (e.g., smart phones, tablets, wearable devices, or another mobile device), computing devices (e.g., laptop, notebook, portable personal computer, or another computing device), batteries (e.g., nickel-cadmium, lead-acid, nickel-metal hydride, nickel-zinc, silver-oxide, lithium-ion, lithium polymer, or another battery), speakers, or another electronic device.

Switching module 106 may be configured to selectively couple transformer 110 to voltage source 102 or to reference node 116 using one or more switching signals 132. Switching module 106 may include one or more switching elements. Examples of switching elements may include, but are not limited to, silicon controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same. It should be understood that the switching elements may include a high side switch or low side switch. Additionally, although examples may illustrate switching elements as being voltage-controlled, in some examples, switching elements may be current-controlled. Other semiconductor types can also be used, such as, but not limited to, gallium nitride (GaN), and silicon carbide (SiC). Examples of current-controlled elements may include, but are not limited to high electron mobility transistors (HEMTs), BJTs, or other current-controlled elements. Additionally, switching module 106 may include one or more diodes.

Transformer 110 may include first primary side winding 124, first secondary side winding 126, and second secondary side winding 128. Although FIG. 1 illustrates transformer 110 as having 3 windings, transformer 110 may include additional windings, for instance, but not limited to tertiary windings, a second primary side winding, a third secondary side winding, and other windings.

Capacitor 122 may include an electrical component configured to store electrical energy in an electric field. In some examples, capacitor 122 along with transformer 110 may form an LLC resonant tank circuit. Examples of an electrical component configured to store electrical energy in an electric field may include, but are not limited to, ceramic capacitors, film capacitors, electrolytic capacitors (e.g., aluminum, tantalum, niobium, or the like), super capacitors (e.g., double layer, pseudocapacitors, hybrid capacitors), mica capacitors, or the like. Although capacitor 122 may be described as a single capacitor, capacitor 122 may be an array of capacitive elements. For example, capacitor 122 may be an array of capacitive elements coupled in parallel and/or series. In some examples, each capacitive element may be a discrete component, while in other instances, each one of the capacitive elements may be contained within a single package (e.g., capacitor array).

Sensor module 108 may be configured to output an indication 130 of a current at primary side winding 124. In some examples, sensor module 108 may generate indication 130 using capacitive sampling circuitry. In some examples, sensor module 108 may generate indication 130 using resistive sampling circuitry.

Synchronous rectification module 112 may include one or more actively controlled switching elements that are each configured to act as a rectifier. For instance, synchronous rectification module 112 may be activated to create a channel that allows current to flow in one direction and deactivated to close the channel, thereby blocking current in the other direction.

Synchronous rectification module 112 may be configured to rectify a voltage output by first secondary side winding 126 and second secondary side winding 128 using one or more synchronous rectification signals 134. Synchronous rectification module 112 may include one or more switching elements. For example, synchronous rectification module 112 may include a first switching element that generates a first channel for current to flow from first secondary side winding 126 of transformer 110 to load 104 during an activated state of a first synchronous rectification signal of one or more synchronous rectification signals 134. As used herein, an activated state may be indicated by a gate signal that activates or "turns-on" a switching element such that the switching element generates a channel. A gate signal may indicate an activated state using a logical '0', logical '1', or another indication. In this example, synchronous rectification module 112 may include a second switching element that generates a second channel for current to flow from second secondary side winding 128 of transformer 110 to load 104 during an activated state of a second synchronous rectification signal of one or more synchronous rectification signals 134. As used herein, a deactivated state may be indicated by a gate signal that deactivates a switching element. A gate signal may indicate a deactivated state using a logical '0', logical '1', or another indication. In some examples, synchronous rectification module 112 may include one or more diodes.

Controller device 114 may be configured to generate one or more switching signals 132 and one or more synchronous rectification signals 134. Controller device 114 may control switching module 106 to output a voltage and/or current to load 104. In some examples, controller device 114 may include an analog circuit. In some examples, controller device 114 may be a microcontroller on a single integrated circuit containing a processor core, memory, inputs, and outputs. For example, controller device 114 may include processing circuitry including, but not limited to, one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller device 114 may be a combination of one or more analog components and one or more digital components.

In accordance with one or more techniques described herein, controller device 114 may output one or more switching signals 132 to switching module 106. In the example of FIG. 1, switching module 106 may be configured to electrically couple primary side winding 124 of transformer 110 to voltage source 102 during an activated state of a first switching signal of one or more switching signals 132 and to electrically couple primary side winding 124 of transformer 110 to reference node 116 during an activated state of a second switching signal of one or more switching signals 132.

Controller device 114 may receive indication 130 of a current at primary side winding 124. Controller device 114 may determine, using indication 130 of the current at primary side winding 124, one or more synchronous rectification signals 134 for activating synchronous rectification module 112. In the example of FIG. 1, synchronous rectification module 112 is configured to generate a first channel for current to flow from first secondary side winding 126 of transformer 110 to load 104 during an activated state of a first synchronous rectification signal of one or more synchronous rectification signals 134 and to generate a second channel for current to flow from second secondary side winding 128 of transformer 110 to load 104 during an activated state of a second synchronous rectification signal of one or more synchronous rectification signals 134. Controller device 114 may output one or more synchronous rectification signals 134 to synchronous rectification module 112.

Figure 2:
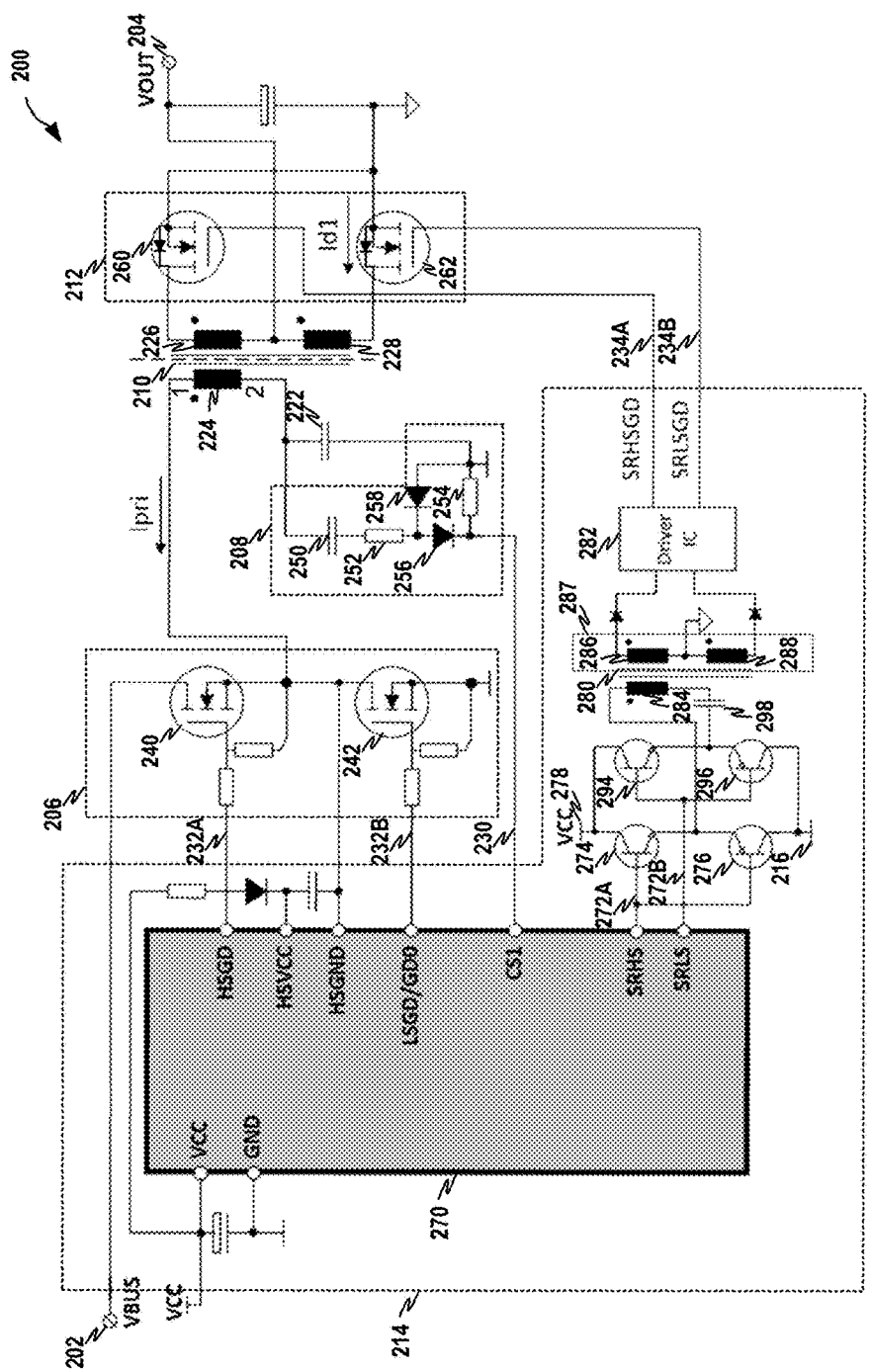
FIG. 2 is a circuit diagram illustrating an example resonant converter circuit configured for use with a controller device with adaptive synchronous rectification, in accordance with one or more techniques of this disclosure.

FIG. 2 is a circuit diagram illustrating an example resonant converter circuit 200 configured for use with a controller device with adaptive synchronous rectification, in accordance with one or more techniques of this disclosure. As shown, circuit 200 may include voltage source 202, load 204, switching module 206, sensor module 208, transformer 210, synchronous rectification module 212, controller device 214, reference node 216, and capacitor 222. Voltage source 202 may be an example of voltage source 102 of FIG. 1. Load 204 may be an example of load 104 of FIG. 1. Switching module 206 may be an example of switching module 106 of FIG. 1. Sensor module 208 may be an example of sensor module 108 of FIG. 1. Transformer 210 may be an example of transformer 110 of FIG. 1. For example, transformer 210 may include primary side winding 224, first secondary side winding 226, and second secondary side winding 228. Synchronous rectification module 212 may be an example of synchronous rectification module 112 of FIG. 1. Controller device 214 may be an example of controller device 114 of FIG. 1.

In the example of FIG. 2, controller device 214 outputs high side switching signal 232A and low side switching signal 232B (collectively, one or more switching signals 232). However, in some examples, one or more switching signals 132 may include a single switching signal. Similarly, in the example of FIG. 2, controller device 214 outputs high side synchronous rectification signal 234A and low side synchronous rectification signal 234B (collectively, one or more synchronous rectification signals 234). However, in some examples, one or more synchronous rectification signals 134 may include a single synchronous rectification signal.

Switching module 206 may include high side switching element 240 configured to electrically couple a first node of primary side winding 224 to voltage source 202 during an activated state of high side switching signal 232A. Similarly, switching module 206 may include low side switching element 242 configured to electrically couple the first node of primary side winding 224 to reference node 216 during the activated state of low side switching signal 232B. In the example of FIG. 2, a second node of primary side winding 224 is coupled to reference node 216 via capacitor 222.

Sensor module 208 may include capacitive sampling circuitry. For example, sensor module 208 may include capacitive sampling circuitry that includes capacitor 250, resistor 252, resistor 254, diode 256, and diode 258. As shown, sensor module 208 may be coupled in parallel with capacitor 222. More specifically, for example, capacitor 250, resistor 252, and diode 256 may form a series string that has a first side coupled to a first side of capacitor 222 and a second side coupled, via resistor 254, to a second side of capacitor 222. As shown, in this example, an anode of diode 258 is coupled to the second side of capacitor 222 and a cathode of diode 258 is coupled to an anode of diode 256. In this example, a cathode of diode 256 is coupled to resistor 254 and forms the second side of the series string formed by capacitor 250, resistor 252, and diode 256. In the example of FIG. 2, the second side of the series string formed by capacitor 250, resistor 252, and diode 256 may output indication 230 of the current at primary side winding 224. In some examples, sensor module 208 may use a resistive sampling circuitry, or another sampling circuitry.

Synchronous rectification module 212 may include first switching element 260 and second switching element 262. First switching element 260 may be configured to generate a first channel that permits current to flow from first secondary side winding 226 to load 204 during an activated state of high side synchronous rectification signal 234A. Second switching element may be configured to generate a second channel that permits current to flow from second secondary side winding 228 to load 204 during an activated state of low side synchronous rectification signal 234B. As shown in FIG. 2, first switching element 260 may include a body diode that permits current to flow from first secondary side winding 226 to load 204. Similarly, in some examples, second switching element 262 may include a body diode that permits current to flow from second secondary side winding 228 to load 204.

In the example of FIG. 2, processing circuitry is arranged in integrated circuit 270. In this example, integrated circuit 270 may output high side control signal 272A to first high side switching element 274 and second high side switching element 276 to couple a first node of primary side winding 284 of transformer 280 to voltage source 278 or reference node 216. Similarly, integrated circuit 270 may output low side control signal 272B to first low side switching element 294 and second low side switching element 296 to couple, via capacitor 298, a second node of primary side winding 284 of transformer 280 to voltage source 278 or reference node 216. As shown in FIG. 2, driver module 282 may be coupled to first secondary side winding 286 and/or second secondary side winding 288 (collectively, secondary side winding 287). In some examples, driver module 282 may activate synchronous rectification module 212 using a signal at secondary side winding 287 of transformer 280. For example, driver module 282 may activate first switching element 260 when current is received from first secondary side winding 286. In some examples, driver module 282 may activate second switching element 262 when current is received from second secondary side winding 288.

Figure 3:
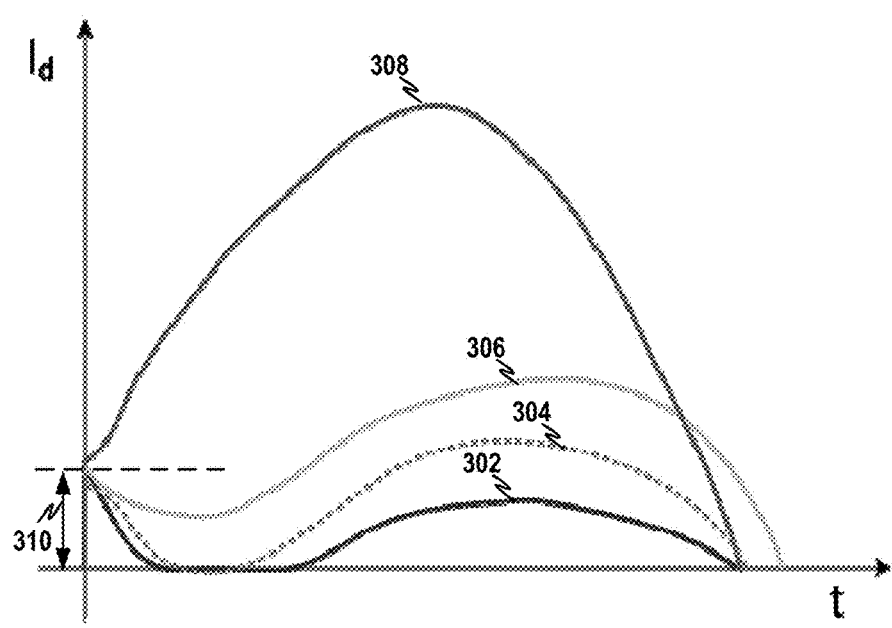
FIG. 3 is a graphical illustration of exemplary current at a synchronous rectification module during various loadings, in accordance with one or more techniques of this disclosure.

FIG. 3 is a graphical illustration of exemplary current at a synchronous rectification module during various loadings, in accordance with one or more techniques of this disclosure. The abscissa axis (e.g., horizontal) of FIG. 3 represents time and the ordinate axis (e.g., vertical) of FIG. 3 represents current at a synchronous rectification module for a very light load 302, current at a synchronous rectification module for a light load 304, current at a synchronous rectification module for a medium load 306, and current at a synchronous rectification module for a heavy load 308. FIG. 3 is discussed with reference to system 100 of FIG. 1 and circuit 200 of FIG. 2 for exemplary purposes only.

In the example of FIG. 3, there is surge current 310 initially for loadings 302-308. Surge current 310 is due to the SR-MOSFET parasitic capacitance ("Coss"). For example, surge current 310 may be due to a parasitic capacitance of first switching element 260 and/or second switching element 262.

As shown in FIG. 3, at heavy load 308 and medium load 306, the LLC SR gate turn on point may immediately follow the corresponding primary gate turn on to ensure the majority of the LLC rectification current flowing through the SR MOSFET Channel. However, at light load 304 and/or very light load 302, after the surge current, the initial rectification current could be very small and could even reach zero, as shown in FIG. 3. As such, it may not be desirable to turn on the SR-MOSFET exactly at this initial moment to prevent the SR-MOSFET current from flowing reversely from MOSFET drain to source and the LLC Vout Cap to be discharged via the SR MOSFET, which may affect system efficiency. Moreover, turning on the SR-MOSFET exactly at the initial moment may add Vout ripple and may increase SR MOSFET voltage stress if subsequently the SR gate is forced to immediately turn off with reverse current through the SR-MOSFET.

Another finding of FIG. 3 is that a desired SR-MOSFET on-time varies slightly at different loading. At light load 304, the desired SR-MOSFET on-time is slightly shorter than medium load 306 as the LLC primary current is very close to LLC transformer magnetizing current during the beginning and ending point of the magnetizing phase. At heavy load 308, however, the desired SR-MOSFET on-time is shorter than medium load 306 as the LLC transformer reflection voltage is affected by the transformer secondary side leakage inductance at heavy load 308.

Figure 4:
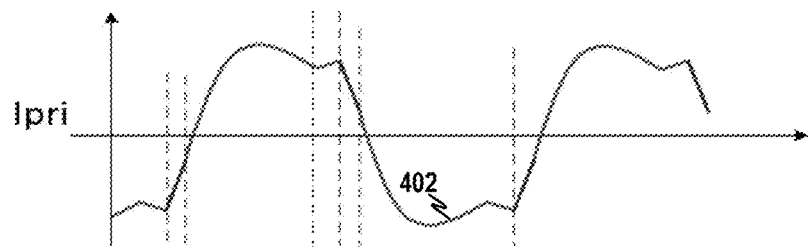
FIG. 4 is a graphical illustration of exemplary primary side winding current of a resonant converter circuit operating in discontinuous-conduction mode, in accordance with one or more techniques of this disclosure.

FIG. 4 is a graphical illustration of exemplary primary side winding current of a resonant converter circuit operating in discontinuous-conduction mode, in accordance with one or more techniques of this disclosure. The abscissa axis (e.g., horizontal) of FIG. 4 represents time and the ordinate axis (e.g., vertical) of FIG. 4 represents primary side winding current 402 of a resonant converter circuit operating in discontinuous-conduction mode (DCM).

Figure 5:
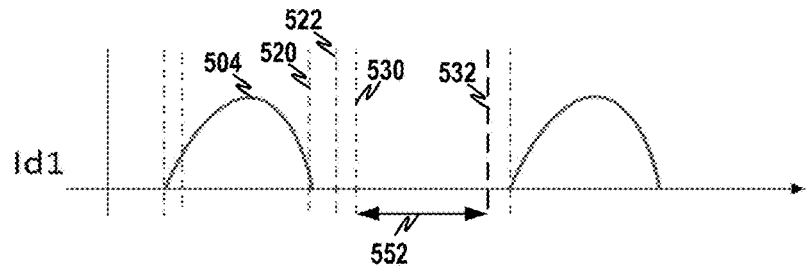
FIG. 5 is a graphical illustration of exemplary synchronous rectification current of a resonant converter circuit for the primary side winding current of FIG. 4, in accordance with one or more techniques of this disclosure.

FIG. 5 is a graphical illustration of exemplary synchronous rectification current of a resonant converter circuit for primary side winding current 402 of FIG. 4, in accordance with one or more techniques of this disclosure. The abscissa axis (e.g., horizontal) of FIG. 5 represents time and the ordinate axis (e.g., vertical) of FIG. 5 represents synchronous rectification current 504 of a resonant converter circuit for primary side winding current 402 of FIG. 4.

When LLC operation frequency is lower than the LLC resonant frequency, synchronous rectification current 504 ("Id1") returns to 0 amperes (A) at time 520, which is earlier than the primary gate turned off time 522, which is so-called DCM operation mode. In order to avoid current reverse flowing, the SR gate may be turned off slightly earlier than time 520 when synchronous rectification current 504 returns to 0 A.

In some examples, the synchronous rectifier conducting time may be constant regardless of the loading level because it is proportional to the LLC resonant period. Maximum gate on-time 552 ("$t_{SRON\_MAX}$"), as shown in FIG. 5, may be defined as the period from the primary LLC gate rising edge 530 to the secondary SR gate falling edge 532. Maximum gate on-time 552 may be used to limit the turn-off point of the SR gate. In the DCM condition, the SR gate may be turned off once the on-time reaches maximum gate on-time 552 ("$t_{SRON\_MAX}$").

Figure 6:
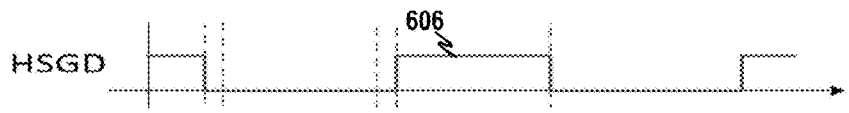
FIG. 6 is a graphical illustration of an exemplary high side gate drive signal of a resonant converter circuit for the primary side winding current of FIG. 4, in accordance with one or more techniques of this disclosure.

FIG. 6 is a graphical illustration of an exemplary high side gate drive signal of a resonant converter circuit for primary side winding current 402 of FIG. 4, in accordance with one or more techniques of this disclosure. The abscissa axis (e.g., horizontal) of FIG. 6 represents time and the ordinate axis (e.g., vertical) of FIG. 6 represents high side gate drive signal 606 of a resonant converter circuit for primary side winding current 402 of FIG. 4.

Figure 7:
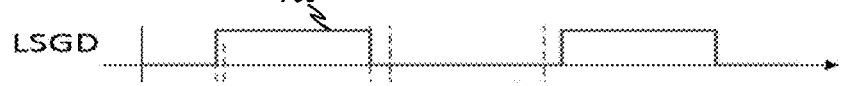
FIG. 7 is a graphical illustration of an exemplary low side gate drive signal of a resonant converter circuit for the primary side winding current of FIG. 4, in accordance with one or more techniques of this disclosure.

FIG. 7 is a graphical illustration of an exemplary low side gate drive signal of a resonant converter circuit for primary side winding current 402 of FIG. 4, in accordance with one or more techniques of this disclosure. The abscissa axis (e.g., horizontal) of FIG. 7 represents time and the ordinate axis (e.g., vertical) of FIG. 7 represents low side gate drive signal 708 of a resonant converter circuit for primary side winding current 402 of FIG. 4.

Figure 8:
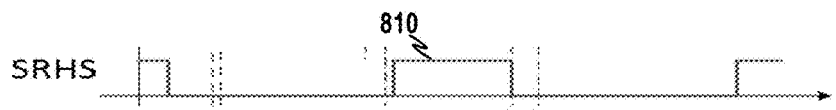
FIG. 8 is a graphical illustration of an exemplary high side synchronous rectification signal of a resonant converter circuit for the primary side winding current of FIG. 4, in accordance with one or more techniques of this disclosure.

FIG. 8 is a graphical illustration of an exemplary high side synchronous rectification signal of a resonant converter circuit for primary side winding current 402 of FIG. 4, in accordance with one or more techniques of this disclosure. The abscissa axis (e.g., horizontal) of FIG. 8 represents time and the ordinate axis (e.g., vertical) of FIG. 8 represents high side synchronous rectification signal 810 of a resonant converter circuit for primary side winding current 402 of FIG. 4.

Figure 9:
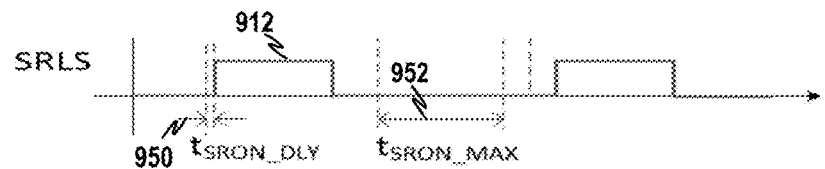
FIG. 9 is a graphical illustration of an exemplary low side synchronous rectification signal of a resonant converter circuit for the primary side winding current of FIG. 4, in accordance with one or more techniques of this disclosure.

FIG. 9 is a graphical illustration of an exemplary low side synchronous rectification signal of a resonant converter circuit for primary side winding current 402 of FIG. 4, in accordance with one or more techniques of this disclosure. The abscissa axis (e.g., horizontal) of FIG. 9 represents time and the ordinate axis (e.g., vertical) of FIG. 9 represents low side synchronous rectification signal 912 of a resonant converter circuit for primary side winding current 402 of FIG. 4, in accordance with one or more techniques of this disclosure. FIG. 9 is discussed with respect to FIG. 1 for exemplary purposes only.

In the example of FIG. 9, the SR gate on-moment is controlled by gate turn-on delay 950 ("$t_{SRON\_DLY}$"), which varies corresponding to the loading levels. Said differently, controller device 114 of FIG. 1 may determine gate turn-on delay 950 using primary side winding current 402 of FIG. 4. The SR gate off moment at LLC DCM conditions may be controlled by maximum gate on-time 952 ("$t_{SRON\_MAX}$"), which is also adaptively set corresponding to the loading levels. Said differently, controller device 114 of FIG. 1 may determine maximum gate on-time 952 using primary side winding current 402 of FIG. 4.

Figure 10:
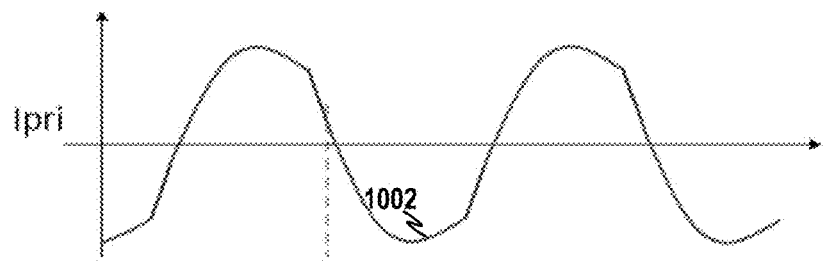
FIG. 10 is a graphical illustration of exemplary primary side winding current of a resonant converter circuit operating in continuous-conduction mode, in accordance with one or more techniques of this disclosure.

FIG. 10 is a graphical illustration of exemplary primary side winding current of a resonant converter circuit operating in continuous-conduction mode, in accordance with one or more techniques of this disclosure. The abscissa axis (e.g., horizontal) of FIG. 10 represents time and the ordinate axis (e.g., vertical) of FIG. 10 represents primary side winding current 1002 of a resonant converter circuit operating in continuous-conduction mode (CCM).

Figure 11:
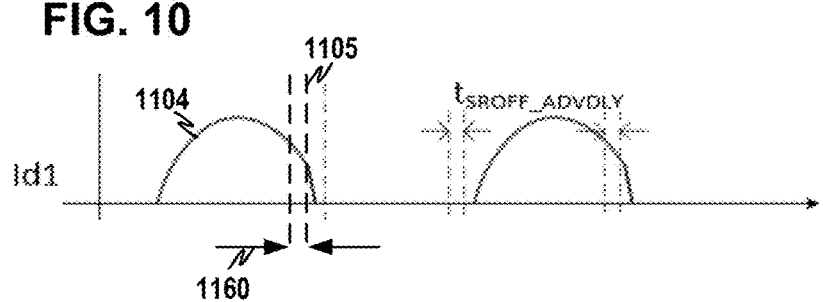
FIG. 11 is a graphical illustration of exemplary synchronous rectification current of a resonant converter circuit for the primary side winding current of FIG. 10, in accordance with one or more techniques of this disclosure.

FIG. 11 is a graphical illustration of exemplary synchronous rectification current of a resonant converter circuit for primary side winding current 1002 of FIG. 10, in accordance with one or more techniques of this disclosure. The abscissa axis (e.g., horizontal) of FIG. 11 represents time and the ordinate axis (e.g., vertical) of FIG. 11 represents synchronous rectification current 1104 of a resonant converter circuit for primary side winding current 1002 of FIG. 10. FIG. 11 is discussed with reference to FIG. 1 for exemplary purposes only.

In the CCM zone, synchronous rectification current 1104 ("Id1"), as shown in FIG. 11, is still conducting at the primary gate turn off moment 1105, but will return to 0 A very fast. The SR gate off may be generated at the same moment as the primary gate off for CCM condition. In some examples, advance delay 1160 ("$t_{SROFF\_ADVDLY}$") may be inserted to turn off the SR gate before respective primary gate off in order to increase the SR operation reliability. Advance delay 1160 ("$t_{SROFF\_ADVDLY}$") may be a configurable fixed value. In the CCM condition, the maximum synchronous rectification on-time ("$t_{SRON}$") obtained by one or more techniques described herein may be shorter than a maximum gate on-time ("$t_{SRON\_MAX}$").

Figure 12:
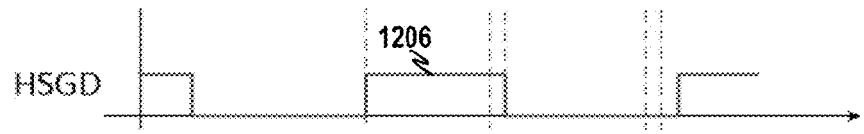
FIG. 12 is a graphical illustration of an exemplary high side gate drive signal of a resonant converter circuit for the primary side winding current of FIG. 10, in accordance with one or more techniques of this disclosure.

FIG. 12 is a graphical illustration of an exemplary high side gate drive signal of a resonant converter circuit for primary side winding current 1002 of FIG. 10, in accordance with one or more techniques of this disclosure. The abscissa axis (e.g., horizontal) of FIG. 12 represents time and the ordinate axis (e.g., vertical) of FIG. 12 represents high side gate drive signal 1206 of a resonant converter circuit for primary side winding current 1002 of FIG. 10.

Figure 13:
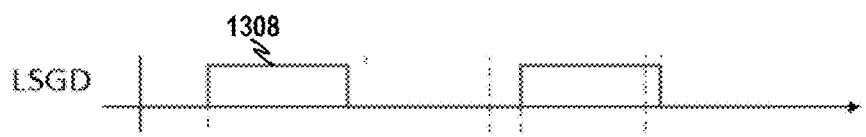
FIG. 13 is a graphical illustration of an exemplary low side gate drive signal of a resonant converter circuit for the primary side winding current of FIG. 10, in accordance with one or more techniques of this disclosure.

FIG. 13 is a graphical illustration of an exemplary low side gate drive signal of a resonant converter circuit for primary side winding current 1002 of FIG. 10, in accordance with one or more techniques of this disclosure. The abscissa axis (e.g., horizontal) of FIG. 13 represents time and the ordinate axis (e.g., vertical) of FIG. 13 represents low side gate drive signal 1308 of a resonant converter circuit for primary side winding current 1002 of FIG. 10.

Figure 14:
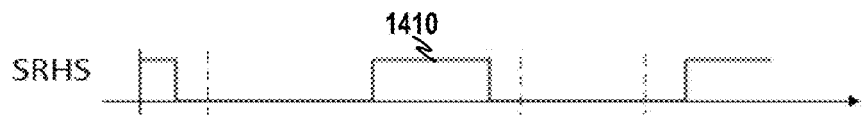
FIG. 14 is a graphical illustration of an exemplary high side synchronous rectification signal of a resonant converter circuit for the primary side winding current of FIG. 10, in accordance with one or more techniques of this disclosure.

FIG. 14 is a graphical illustration of an exemplary high side synchronous rectification signal of a resonant converter circuit for primary side winding current 1002 of FIG. 10, in accordance with one or more techniques of this disclosure. The abscissa axis (e.g., horizontal) of FIG. 14 represents time and the ordinate axis (e.g., vertical) of FIG. 14 represents high side synchronous rectification signal 1410 of a resonant converter circuit for primary side winding current 1002 of FIG. 10.

Figure 15:
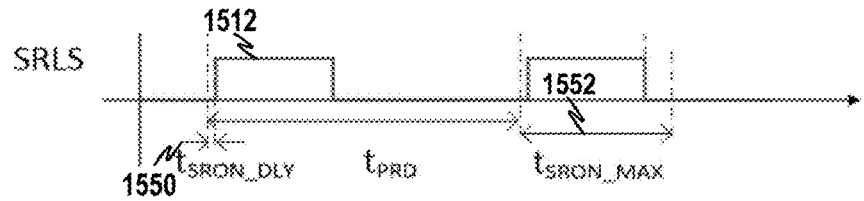
FIG. 15 is a graphical illustration of an exemplary low side synchronous rectification signal of a resonant converter circuit for the primary side winding current of FIG. 10, in accordance with one or more techniques of this disclosure.

FIG. 15 is a graphical illustration of an exemplary low side synchronous rectification signal of a resonant converter circuit for primary side winding current 1002 of FIG. 10, in accordance with one or more techniques of this disclosure. The abscissa axis (e.g., horizontal) of FIG. 15 represents time and the ordinate axis (e.g., vertical) of FIG. 15 represents low side synchronous rectification signal 1512 of a resonant converter circuit for primary side winding current 1002 of FIG. 10, in accordance with one or more techniques of this disclosure. FIG. 15 is discussed with respect to FIG. 1 for exemplary purposes only.

In the LLC CCM condition of FIG. 15, the SR gate on-moment may be controlled by gate turn-on delay 1550 ("$t_{SRON\_DLY}$"), which varies corresponding to the loading levels. Said differently, controller device 114 of FIG. 1 may determine gate turn-on delay 1550 using primary side winding current 1002 of FIG. 10. The SRLS/SRHS gate off moment at LLC CCM conditions may be based on the respective primary side LSGD/HSGD gate off moment, with an advance delay TSROFF_ADVDLY 1160 of FIG. 11 inserted. Said differently, a gate off moment of low side synchronous rectification signal 1512 may be in advance of the gate off moment of low side gate drive signal 1308 of FIG. 13 by TSROFF_ADVDLY 1160 of FIG. 11. Similarly, a gate off moment of high side synchronous rectification signal 1410 may be in advance of the gate off moment of high side gate drive signal 1206 of FIG. 12 by TSROFF_ADVDLY 1160 of FIG. 11. In some examples, the SR gate off moment at LLC CCM conditions may not rely on or be controller by maximum gate on time 1552. In the examples of FIGS. 10-15, the SR gate off moment at LLC CCM conditions occurs before the respective primary gate off, with an advance delay $T_{SROFF\_ADVDLY}$.

If both CCM and DCM situation considered, the combined logic to determine SR gate off may be expressed in pseudo-code as follows.

if ($t_{SRON}>=t_{SRON\_max} \| t_{SRON}>=t_{PRD}/2-t_{dead}-t_{SROFF\_ADVDLY}$) SR gate off where $t_{dead}$ is the dead time inserted between a low side switching signal ("LSGD") falling edge and the following high side switching signal ("HSGD") rising edge, and/or between a high side switching signal ("HSGD") falling edge and the following low side switching signal ("LSGD") rising edge.

Said differently, in some examples, controller device 114 may generate one or more synchronous rectification signals 134 such that an operation time of synchronous rectification module 112 ("$t_{SRON}$") is less than an operation time of the switching module 106 ("$t_{PRD}/2-t_{dead}$") by a predetermined advance delay ("$t_{SROFF\_ADVDLY}$"). In some examples, controller device 114 may generate one or more synchronous rectification signals 134 such that an operation time of synchronous rectification module 112 ("$t_{SRON}$") is less than maximum gate on-time 1552 ("$t_{SRON\_MAX}$"), which may be adaptively set corresponding to loading levels.

Figure 16:
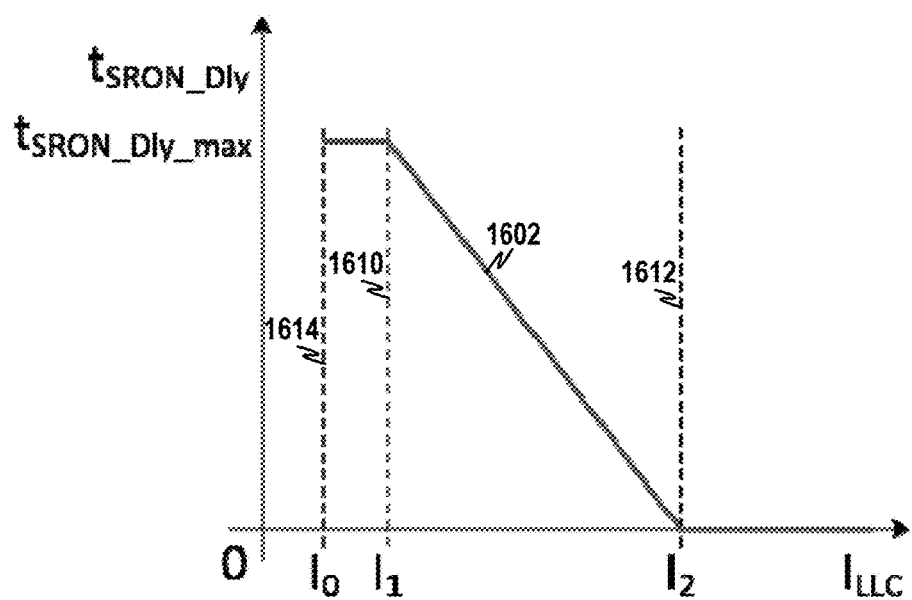
FIG. 16 is a graphical illustration of exemplary gate turn-on delay, in accordance with one or more techniques of this disclosure.

FIG. 16 is a graphical illustration of exemplary gate turn-on delay, in accordance with one or more techniques of this disclosure. The abscissa axis (e.g., horizontal) of FIG. 16 represents primary side winding current and the ordinate axis (e.g., vertical) of FIG. 16 represents gate turn-on delay 1602 ("$t_{SRON\_Dly}$"), in accordance with one or more techniques of this disclosure. FIG. 16 is discussed with reference to system 100 of FIG. 1 and circuit 200 of FIG. 2 for exemplary purposes only.

Controller device 114 may determine gate turn-on delay 1602 using current at the primary side winding 124. In the example of FIG. 16, an adaptive SR gate turn on control is proposed to improve efficiency and reliability of SR operation. In the example of FIG. 16, if the measured current is higher than threshold 1612 ("$I_2$"), the SR gate may be turned on at the same time as the corresponding primary gate such that the gate turn-on delay 1602 is zero ("$t_{SRON\_DLY}=0$"). If the measured current is lower than threshold 1610 ("$I_1$"), the loading current may be already quite small. A fixed SR turn on delay ("$t_{SRON\_DLY\_max}$") may be applied for SR MOSFET switched on. If the measured current is between threshold 1610 ("$I_1$") and threshold 1612 ("$I_2$"), the turn-on delay 1602 may be linearly interpolated. The turn-on delay 1602 may be calculated in real-time, or obtained by making a lookup table by interpolation method. If the measured current is less that threshold 1614 ("$I_0$"), the loading current may be extremely small and no SR operation is required. The SR operation may be totally off. That is, when the loading current is very small (e.g., less than threshold 1614), efficiency may be improved by not activating the SR. As such, when the current is smaller than threshold 1614 ("$I_0$") as in FIG. 16, the SR operation may be stopped, and controller device 114 may enter a "SR light load mode."

Said differently, for example, controller device 114 may determine a gate turn-on delay 1602 using indication 130 of a current at primary side winding 124. As used herein, an edge of a first synchronous rectification signal of one or more synchronous rectification signals 134 that activates the activated state of the first synchronous rectification of one or more synchronous rectification signals 134 may be delayed from an edge of a first switching signal of one or more switching signals 132 that activates the activated state of the first switching signal of one or more switching signals 132 by the gate turn-on delay. Similarly, an edge of a second synchronous rectification signal of one or more synchronous rectification signals 134 that activates the activated state of the second synchronous rectification signal of one or more synchronous rectification signals 134 may be delayed from an edge of a second switching signal of one or more switching signals 132 that activates the activated state of the second switching signal of one or more switching signals 132 by the gate turn-on delay.

In the example of FIG. 16, controller device 114 may determine the gate turn-on delay 1602 to correspond to a predetermined delay ("$t_{SRON\_Dly\_max}$") when the current at primary side winding 124 is less than threshold 1610. Controller device 114 may determine the gate turn-on delay 1602 to correspond to zero when the current at primary side winding 124 is greater than threshold 1612. In the example of FIG. 16, threshold 1612 is greater than threshold 1610. Controller device 114 may determine the gate turn-on delay 1602 to correspond to a portion of predetermined delay ("$t_{SRON\_Dly\_max}$") when the current at primary side winding 124 is greater than threshold 1610 and less than threshold 1612. As shown, in some examples, controller device 114 may determine the portion of the predetermined delay using linear interpolation. In some examples, controller device 114 may determine the portion of the predetermined delay using a look-up table.

Controller device 114 may determine to deactivate synchronous rectification module 112 when the current at primary side winding 124 is less than threshold 1614. In the example of FIG. 16, threshold 1614 is less than threshold 1610. As used herein, synchronous rectification module 112 may not generate a first channel when synchronous rectification module 112 is deactivated and synchronous rectification module 112 may not generate a second channel when synchronous rectification module 112 is deactivated. Said differently, controller device 114 may drive first switching element 260 and second switching element 262 of FIG. 2 to deactivate respective channels when the current at primary side winding 124 is less than threshold 1614.

Figure 17:
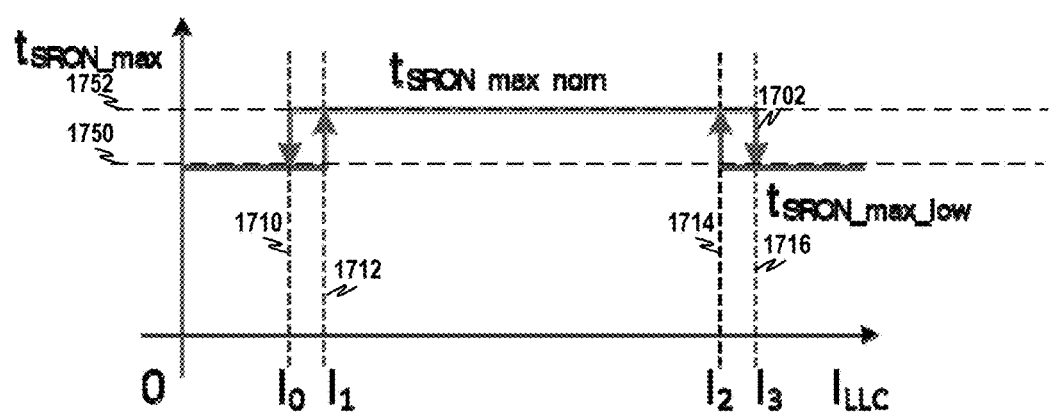
FIG. 17 is a graphical illustration of exemplary maximum gate on-time, in accordance with one or more techniques of this disclosure.

FIG. 17 is a graphical illustration of exemplary maximum gate on-time, in accordance with one or more techniques of this disclosure. The abscissa axis (e.g., horizontal) of FIG. 17 represents primary side winding current and the ordinate axis (e.g., vertical) of FIG. 17 represents maximum gate on-time 1702 ("$t_{SRON\_max}$"), in accordance with one or more techniques of this disclosure. FIG. 17 is discussed with reference to system 100 of FIG. 1 and circuit 200 of FIG. 2 for exemplary purposes only.

In the example of FIG. 17, controller device 114 may determine maximum gate on-time 1702 for the synchronous rectification module 112 using indication 130 of the current at primary side winding 124. In this example, controller device 114 may generate a low side synchronous rectification signal of one or more synchronous rectification signals 134 such that an operation time of the low side synchronous rectification signal is less than maximum gate on-time 1702 and such that an operation time of a high side synchronous rectification signal of one or more synchronous rectification signals 134 is less than maximum gate on-time 1702.

For example, controller device 114 may be configured to use current measurement hysteresis for de-bouncing. As shown FIG. 17, when the measured current is lower than threshold 1710 ("$I_0$"), predetermined value 1750 (a smaller maximum on-time or "$t_{SRON\_max\_low}$")) may be used to turn off the SR gate. If the current increases to threshold 1712 ("$I_1$"), predetermined value 1752 (e.g., a higher maximum SR on-time or "$t\_(t_{SRON\_max\_nom}$") may be used to turn off the SR gate. A similar process may be used for threshold 1714 and threshold 1716.

Said differently, for example, controller device 114 may determine, when the current at primary side winding 124 reduces, maximum gate on-time 1702 to correspond to first predetermined value 1750 when the current at primary side winding 124 is less than threshold 1710. Controller device 114 may determine, when the current at primary side winding 124 increases, maximum gate on-time 1702 to correspond to second predetermined value 1752 when the current at primary side winding 124 is greater than threshold 1712. In the example of FIG. 17, threshold 1712 is greater than threshold 1710.

Controller device 114 may determine, when the current at primary side winding 124 reduces, maximum gate on-time 1702 to correspond to second predetermined value 1752 when the current at primary side winding 124 is less than threshold 1714. In the example of FIG. 17, threshold 1714 is greater than threshold 1712. Controller device 114 may determine, when the current at primary side winding 124 increases, maximum gate on-time 1702 to correspond to first predetermined value 1750 when the current at primary side winding 124 is greater than threshold 1716. In the example of FIG. 17, threshold 1716 is greater than threshold 1714.

Figure 18:
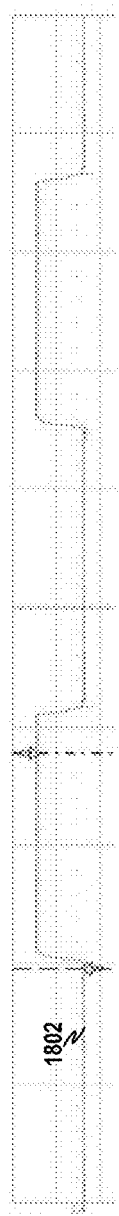
FIG. 18 is a graphical illustration of exemplary low side gate drive signal of a resonant converter circuit operating at 100 percent loading, in accordance with one or more techniques of this disclosure.

FIG. 18 is a graphical illustration of exemplary low side gate drive signal of a resonant converter circuit operating at 100 percent loading, in accordance with one or more techniques of this disclosure. The abscissa axis (e.g., horizontal) of FIG. 18 represents time and the ordinate axis (e.g., vertical) of FIG. 18 represents low side gate drive signal 1802 of a resonant converter circuit operating at 100 percent loading.

Figure 19:
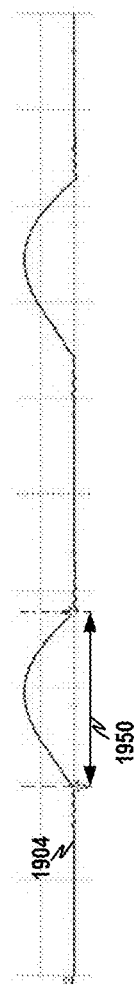
FIG. 19 is a graphical illustration of exemplary synchronous rectification current of a resonant converter circuit operating at 100 percent loading, in accordance with one or more techniques of this disclosure.

FIG. 19 is a graphical illustration of exemplary synchronous rectification current of a resonant converter circuit operating at 100 percent loading, in accordance with one or more techniques of this disclosure. The abscissa axis (e.g., horizontal) of FIG. 19 represents time and the ordinate axis (e.g., vertical) of FIG. 19 represents synchronous rectification current 1904 of a resonant converter circuit operating at 100 percent loading. As shown, synchronous rectification current 1904 has a width 1950 of 3.62 microseconds (μs).

Figure 20:
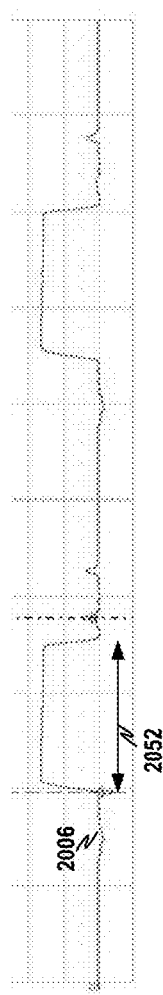
FIG. 20 is a graphical illustration of exemplary low side synchronous rectification signal of a resonant converter circuit operating at 100 percent loading, in accordance with one or more techniques of this disclosure.

FIG. 20 is a graphical illustration of exemplary low side synchronous rectification signal of a resonant converter circuit operating at 100 percent loading, in accordance with one or more techniques of this disclosure. The abscissa axis (e.g., horizontal) of FIG. 20 represents time and the ordinate axis (e.g., vertical) of FIG. 20 represents low side synchronous rectification signal 2006 of a resonant converter circuit operating at 100 percent loading. In the example of FIG. 20, low side synchronous rectification signal 2006 has width 2052 of 3.03 microseconds (μs).

Figure 21:
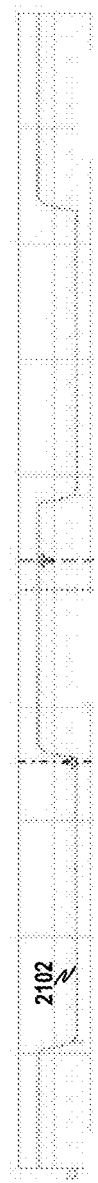
FIG. 21 is a graphical illustration of exemplary low side gate drive signal of a resonant converter circuit operating at 150 percent loading, in accordance with one or more techniques of this disclosure.

FIG. 21 is a graphical illustration of exemplary low side gate drive signal of a resonant converter circuit operating at 150 percent loading, in accordance with one or more techniques of this disclosure. The abscissa axis (e.g., horizontal) of FIG. 21 represents time and the ordinate axis (e.g., vertical) of FIG. 21 represents low side gate drive signal 2102 of a resonant converter circuit operating at 150 percent loading.

Figure 22:
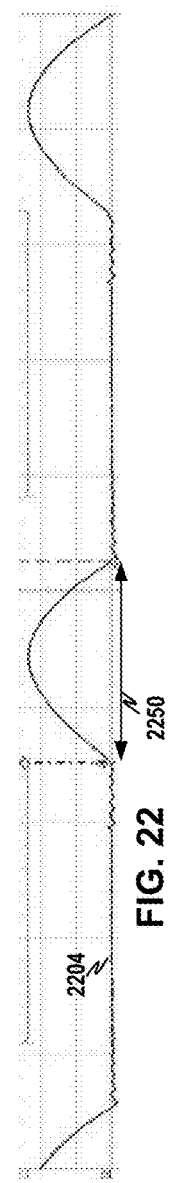
FIG. 22 is a graphical illustration of exemplary synchronous rectification current of a resonant converter circuit operating at 150 percent loading, in accordance with one or more techniques of this disclosure.

FIG. 22 is a graphical illustration of exemplary synchronous rectification current of a resonant converter circuit operating at 150 percent loading, in accordance with one or more techniques of this disclosure. The abscissa axis (e.g., horizontal) of FIG. 22 represents time and the ordinate axis (e.g., vertical) of FIG. 22 represents synchronous rectification current 2204 of a resonant converter circuit operating at 150 percent loading. As shown, synchronous rectification current 2204 has a width 2250 of 3.47 microseconds (μs), which is less than width 1950 of FIG. 19 for 100 percent loading.

Figure 23:
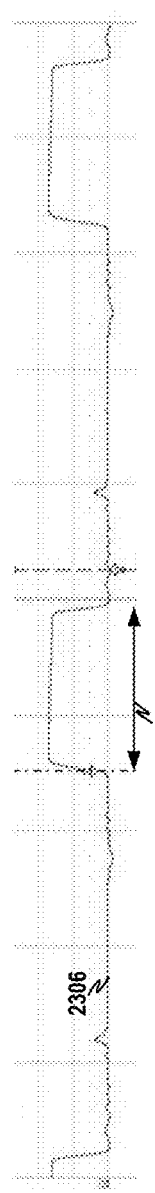
FIG. 23 is a graphical illustration of exemplary low side synchronous rectification signal of a resonant converter circuit operating at 150 percent loading, in accordance with one or more techniques of this disclosure.

FIG. 23 is a graphical illustration of exemplary low side synchronous rectification signal of a resonant converter circuit operating at 150 percent loading, in accordance with one or more techniques of this disclosure. The abscissa axis (e.g., horizontal) of FIG. 23 represents time and the ordinate axis (e.g., vertical) of FIG. 23 represents low side synchronous rectification signal 2306 of a resonant converter circuit operating at 150 percent loading. In the example of FIG. 23, low side synchronous rectification signal 2306 has width 2352 of 2.75 microseconds (μs)), which is slightly less than width 2052 of FIG. 20 for 100 percent loading to account for the differences of width 2250 of FIG. 22 for 150 percent loading and width 1950 of FIG. 19 for 100 percent loading.

As illustrated in the examples of FIGS. 18-23, controller device 114 may generate one or more synchronous rectification signals 134 that control synchronous rectification using a maximum gate on-time that is based on a loading, thereby reducing power lost for synchronous rectification compared to systems that only use a predefined or static maximum gate on-time.

Figure 24:
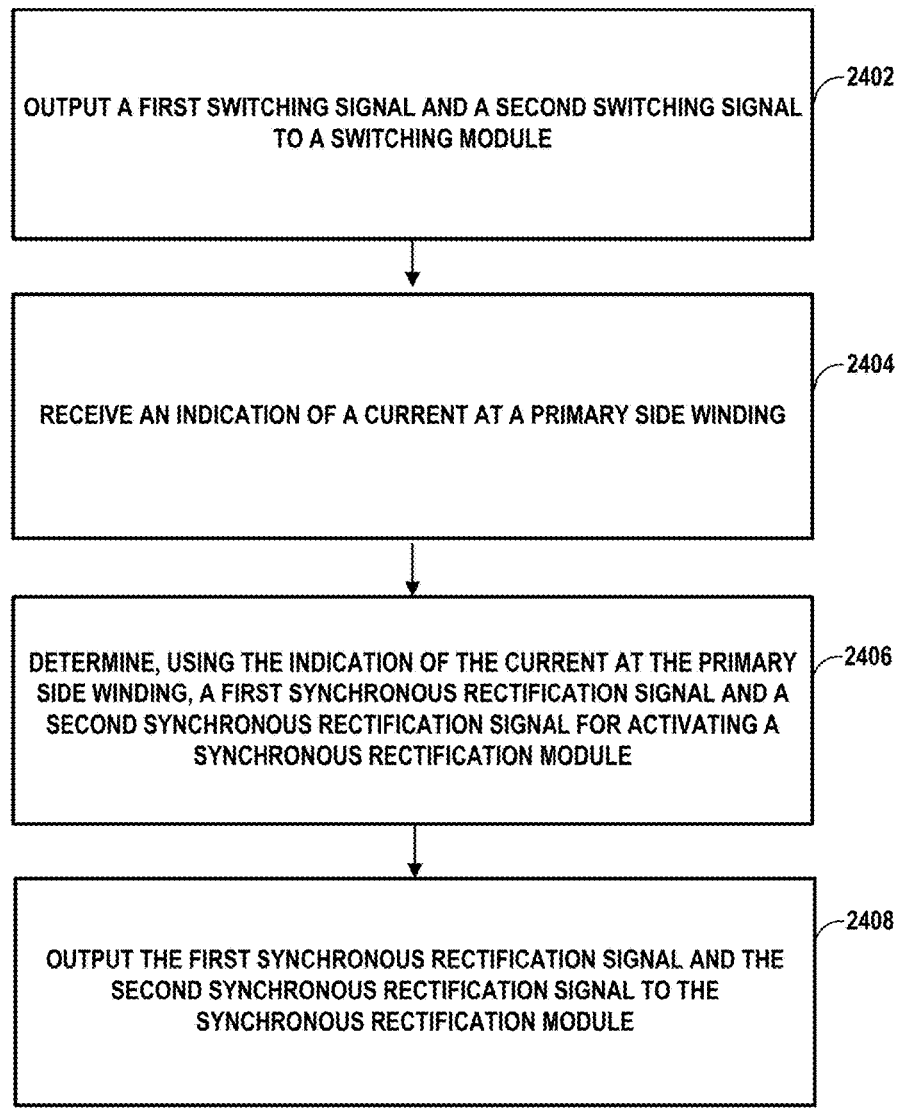
FIG. 24 is a flow diagram for adaptive synchronous rectification, in accordance with one or more techniques of this disclosure.

FIG. 24 is a flow diagram for adaptive synchronous rectification, in accordance with one or more techniques of this disclosure. FIG. 24 is discussed with reference to system 100 of FIG. 1 for exemplary purposes only.

In accordance with one or more techniques of this disclosure, controller device 114 outputs a first switching signal and a second switching signal to switching module 106 (2402). For example, controller device 114 outputs one or more switching signals 132 to switching module 106 to control a voltage output to load 104. Controller device 114 receives indication 130 of a current at primary side winding 124 (2404). Controller device 114 determines, using indication 130 of the current at primary side winding 124, a first synchronous rectification signal and a second synchronous rectification signal for activating synchronous rectification module 112 (2406). For example, controller device 114 determines one or more synchronous rectification signals 134 using a gate turn-on delay that is determined using indication 130 of the current at primary side winding 124. Additionally, or alternatively, controller device 114 determines one or more synchronous rectification signals 134 using a maximum gate on-time that is determined using indication 130 of the current at primary side winding 124. Controller device 114 outputs the first synchronous rectification signal and the second synchronous rectification signal to synchronous rectification module 112 (2408). For example, controller device 114 outputs one or more synchronous rectification signals 134 to synchronous rectification module 112.

The techniques of this disclosure may be implemented in a device or article of manufacture comprising a computer-readable storage medium. The term "processing circuitry," as used herein may refer to any of the foregoing structure or any other structure suitable for processing program code and/or data or otherwise implementing the techniques described herein. Elements of controller device 114 and the processing circuitry of controller device 114 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. Processing circuitry may also include analog components arranged in a mixed-signal IC.

Controller device 114 and the processing circuitry of controller device 114 may include memory. One or more memory devices of the memory may include any volatile or non-volatile media, such as a RAM, ROM, non-volatile RAM (NVRAM), electrically erasable programmable ROM (EEPROM), flash memory, and the like. One or more memory devices of the memory may store computer readable instructions that, when executed by the processing circuitry, cause the processing circuitry to implement the techniques attributed herein to the processing circuitry.

Elements of controller device 114 and/or the processing circuitry of controller device 114 may be programmed with various forms of software. The processing circuitry may be implemented at least in part as, or include, one or more executable applications, application modules, libraries, classes, methods, objects, routines, subroutines, firmware, and/or embedded code, for example. The processing circuitry may be configured to receive voltage signals, determine switching frequencies, and deliver control signals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following numbered examples demonstrate one or more aspects of the disclosure.

Example 1

A controller device for a resonant converter, the controller device comprising processing circuitry configured to: output a first switching signal and a second switching signal to a switching module, the switching module being configured to electrically couple a primary side winding of a transformer to a voltage source during an activated state of the first switching signal and to electrically couple the primary side winding of the transformer to a reference node during an activated state of the second switching signal; receive an indication of a current at the primary side winding; determine, using the indication of the current at the primary side winding, a first synchronous rectification signal and a second synchronous rectification signal for activating a synchronous rectification module, the synchronous rectification module being configured to generate a first channel for current to flow from a first secondary side winding of the transformer to a load during an activated state of the first synchronous rectification signal and to generate a second channel for current to flow from a second secondary side winding of the transformer to the load during an activated state of the second synchronous rectification signal; and output the first synchronous rectification signal and second synchronous rectification signal to the synchronous rectification module.

Example 2

The controller device of example 1, wherein, to determine the first synchronous rectification signal and the second synchronous rectification signal, the processing circuitry is configured to: determine a gate turn-on delay using the indication of the current at the primary side winding, wherein an edge of the first synchronous rectification signal that activates the activated state of the first synchronous rectification signal is delayed from an edge of the first switching signal that activates the activated state of the first switching signal by the gate turn-on delay and wherein an edge of the second synchronous rectification signal that activates the activated state of the second synchronous rectification signal is delayed from an edge of the second switching signal that activates the activated state of the second switching signal by the gate turn-on delay.

Example 3

The controller device of any combination of examples 1-2, wherein, to determine the gate turn-on delay, the processing circuitry is configured to: determine the gate turn-on delay to correspond to a predetermined delay when the current at the primary side winding is less than a first threshold; determine the gate turn-on delay to correspond to zero when the current at the primary side winding is greater than a second threshold, the second threshold being greater than the first threshold; and determine the gate turn-on delay to correspond to a portion of the predetermined delay when the current at the primary side winding is greater than the first threshold and less than the second threshold.

Example 4

The controller device of any combination of examples 1-3, wherein, to determine the gate turn-on delay to correspond to the portion of the predetermined delay, the processing circuitry is configured to: determine the portion of the predetermined delay using linear interpolation or a look-up table.

Example 5

The controller device of any combination of examples 1-4, wherein, to determine the gate turn-on delay, the processing circuitry is configured to: determine to deactivate the synchronous rectification module when the current at the primary side winding is less than a third threshold, the third threshold being less than the first threshold, wherein the synchronous rectification module does not generate the first channel when the synchronous rectification module is deactivated and wherein the synchronous rectification module does not generate the second channel when the synchronous rectification module is deactivated.

Example 6

The controller device of any combination of examples 1-5, wherein, to determine the first synchronous rectification signal and the second synchronous rectification signal, the processing circuitry is configured to: determine a maximum gate on-time for the synchronous rectification module using the indication of the current at the primary side winding; and generate the first synchronous rectification signal and the second synchronous rectification signal such that an operation time of the activated state of the first synchronous rectification signal is less than the maximum gate on-time and such that an operation time of the activated state of the second synchronous rectification signal is less than the maximum gate on-time.

Example 7

The controller device of any combination of examples 1-6, wherein, to determine the maximum gate on-time for the synchronous rectification module, the processing circuitry is configured to: determine, when the current at the primary side winding reduces, the maximum gate on-time to correspond to a first predetermined value when the current at the primary side winding is less than a first threshold; determine, when the current at the primary side winding increases, the maximum gate on-time to correspond to a second predetermined value when the current at the primary side winding is greater than a second threshold, the second threshold being greater than the first threshold; determine, when the current at the primary side winding reduces, the maximum gate on-time to correspond to the second predetermined value when the current at the primary side winding is less than a third threshold, the third threshold being greater than the second threshold; and determine, when the current at the primary side winding increases, the maximum gate on-time to correspond to the first predetermined value when the current at the primary side winding is greater than a fourth threshold, the fourth threshold being greater than the third threshold.

Example 8

The controller device of any combination of examples 1-7, wherein, to generate the first synchronous rectification signal and the second synchronous rectification signal, the processing circuitry is configured to: generate the first synchronous rectification signal and the second synchronous rectification signal such that an operation time of the synchronous rectification module is less than an operation time of the switching module by a predetermined advance delay.

Example 9

The controller device of any combination of examples 1-8, further comprising: wherein the switching module comprises a high side switching element configured to electrically couple a first node of the primary side winding to the voltage source during the activated state of the first switching signal and a low side switching element configured to electrically couple the first node of the primary side winding to the reference node during the activated state of the second switching signal, wherein a second node of the primary side winding is coupled to the reference node via a capacitor; and wherein the synchronous rectification module comprises a first switching element configured to generate the first channel and a second switching element configured to generate the second channel, the first switching element comprising a body diode that permits current to flow from the first secondary side winding to the load and the second switching element comprising a body diode that permits current to flow from the second secondary side winding to the load.

Example 10

The controller device of any combination of examples 1-9, wherein the indication of the current at the primary side winding is output from capacitive sampling circuitry.

Example 11

The controller device of any combination of examples 1-10, wherein the transformer is a first transformer, wherein the voltage source is a first voltage source, and wherein, to output the first synchronous rectification signal and the second synchronous rectification signal, the processing circuitry is configured to: output a high side control signal to a first high side switching element and a second high side switching element to couple a first node of a primary side winding of a second transformer to a second voltage source or the reference node; and output a low side control signal to a first low side switching element and a second low side switching element to couple, via a capacitor, a second node of the primary side winding of the second transformer to the second voltage source or the reference node, wherein a driver module is coupled to a secondary side winding of the second transformer and wherein the driver module activates the synchronous rectification module using a signal at the secondary side winding of the second transformer.

Example 12

A method for voltage regulation comprising: outputting a first switching signal and a second switching signal to a switching module, the switching module being configured to electrically couple a primary side winding of a transformer to a voltage source during an activated state of the first switching signal and to electrically couple the primary side winding of the transformer to a reference node during an activated state of the second switching signal; receiving an indication of a current at the primary side winding; determining, using the indication of the current at the primary side winding, a first synchronous rectification signal and a second synchronous rectification signal for activating a synchronous rectification module, the synchronous rectification module being configured to generate a first channel for current to flow from a first secondary side winding of the transformer to a load during an activated state of the first synchronous rectification signal and to generate a second channel for current to flow from a second secondary side winding of the transformer to the load during an activated state of the second synchronous rectification signal; and outputting the first synchronous rectification signal and second synchronous rectification signal to the synchronous rectification module.

Example 13

The method of example 12, wherein determining the first synchronous rectification signal and second synchronous rectification signal comprises: determining a gate turn-on delay using the indication of the current at the primary side winding, wherein an edge of the first synchronous rectification signal that activates the activated state of the first synchronous rectification signal is delayed from an edge of the first switching signal that activates the activated state of the first switching signal by the gate turn-on delay and wherein an edge of the second synchronous rectification signal that activates the activated state of the second synchronous rectification signal is delayed from an edge of the second switching signal that activates the activated state of the second switching signal by the gate turn-on delay.

Example 14

The method of any combination of examples 12-13, wherein determining the gate turn-on delay comprises: determining the gate turn-on delay to correspond to a predetermined delay when the current at the primary side winding is less than a first threshold; determining the gate turn-on delay to correspond to zero when the current at the primary side winding is greater than a second threshold, the second threshold being greater than the first threshold; and determining the gate turn-on delay to correspond to a portion of the predetermined delay when the current at the primary side winding is greater than the first threshold and less than the second threshold.

Example 15

The method of any combination of examples 12-14, wherein determining the gate turn-on delay to correspond to a portion of the predetermined delay comprises: determining the portion of the predetermined delay using linear interpolation or a look-up table.

Example 16

The method of any combination of examples 12-15, determining to deactivate the synchronous rectification module when the current at the primary side winding is less than a third threshold, the third threshold being less than the first threshold, wherein the synchronous rectification module does not generate the first channel when the synchronous rectification module is deactivated and wherein the synchronous rectification module does not generate the second channel when the synchronous rectification module is deactivated.

Example 17

The method of any combination of examples 12-16, wherein determining the first synchronous rectification signal and the second synchronous rectification signal comprises: determining a maximum gate on-time for the synchronous rectification module using the indication of the current at the primary side winding; and generating the first synchronous rectification signal and the second synchronous rectification signal such that an operation time of the activated state of the first synchronous rectification signal is less than the maximum gate on-time and such that an operation time of the activated state of the second synchronous rectification signal is less than the maximum gate on-time.

Example 18

The method of any combination of examples 12-17, wherein determining the maximum gate on-time comprises: determining, when the current at the primary side winding reduces, the maximum gate on-time to correspond to a first predetermined value when the current at the primary side winding is less than a first threshold; determining, when the current at the primary side winding increases, the maximum gate on-time to correspond to a second predetermined value when the current at the primary side winding is greater than a second threshold, the second threshold being greater than the first threshold; determining, when the current at the primary side winding reduces, the maximum gate on-time to correspond to the second predetermined value when the current at the primary side winding is less than a third threshold, the third threshold being greater than the second threshold; and determining, when the current at the primary side winding increases, the maximum gate on-time to correspond to the first predetermined value when the current at the primary side winding is greater than a fourth threshold, the fourth threshold being greater than the third threshold.

Example 19

The method of any combination of examples 12-18, wherein generating the first synchronous rectification signal and the second synchronous rectification signal comprises: generating the first synchronous rectification signal and the second synchronous rectification signal such that an operation time of the synchronous rectification module is less than an operation time of the switching module by a predetermined advance delay.

Example 20

A resonant converter circuit comprising: a transformer comprising a primary side winding, a first secondary side winding, and a second secondary side winding; a sensor module configured to generate an indication of a current at the primary side winding; a controller device comprising processing circuitry configured to output a first switching signal and a second switching signal, determine, using the indication of the current at the primary side winding, a first synchronous rectification signal and a second synchronous rectification signal, and output the first synchronous rectification signal and the second synchronous rectification signal; a switching module being configured to electrically couple the primary side winding to a voltage source during an activated state of the first switching signal and to electrically couple the primary side winding to a reference node during an activated state of the second switching signal; and a synchronous rectification module configured to generate a first channel for current to flow from the first secondary side winding to a load during an activated state of the first synchronous rectification signal and to generate a second channel for current to flow from the second secondary side winding to the load during an activated state of the second synchronous rectification signal.

Various examples of the disclosure have been described. Any combination of the described systems, operations, or functions is contemplated. These and other examples are within the scope of the following claims.

What is claimed is:

1. A controller device for a resonant converter, the controller device comprising processing circuitry configured to:
    output a first switching signal and a second switching signal to a switching module, the switching module being configured to electrically couple a primary side winding of a transformer to a voltage source during an activated state of the first switching signal and to electrically couple the primary side winding of the transformer to a reference node during an activated state of the second switching signal;
    receive an indication of a current at the primary side winding;
    determine, using the indication of the current at the primary side winding, a first synchronous rectification signal and a second synchronous rectification signal for activating a synchronous rectification module, the synchronous rectification module being configured to generate a first channel for current to flow from a first secondary side winding of the transformer to a load during an activated state of the first synchronous rectification signal and to generate a second channel for current to flow from a second secondary side winding of the transformer to the load during an activated state of the second synchronous rectification signal,
    wherein, to determine the first synchronous rectification signal and the second synchronous rectification signal, the processing circuitry is configured to determine a gate turn-on delay using the indication of the current at the primary side winding, wherein an edge of the first synchronous rectification signal that activates the activated state of the first synchronous rectification signal is delayed from an edge of the first switching signal that activates the activated state of the first switching signal by the gate turn-on delay and wherein an edge of the second synchronous rectification signal that activates the activated state of the second synchronous rectification signal is delayed from an edge of the second switching signal that activates the activated state of the second switching signal by the gate turn-on delay, and
    wherein, to determine the gate turn-on delay, the processing circuitry is configured to:
    determine the gate turn-on delay to correspond to a predetermined delay when the current at the primary side winding is less than a first threshold;
    determine the gate turn-on delay to correspond to zero when the current at the primary side winding is greater than a second threshold, the second threshold being greater than the first threshold; and
    determine the gate turn-on delay to correspond to a portion of the predetermined delay when the current at the primary side winding is greater than the first threshold and less than the second threshold; and
    output the first synchronous rectification signal and second synchronous rectification signal to the synchronous rectification module.

2. The controller device of claim 1, wherein, to determine the gate turn-on delay to correspond to the portion of the predetermined delay, the processing circuitry is configured to:
    determine the portion of the predetermined delay using linear interpolation or a look-up table.

3. The controller device of claim 1, wherein, to determine the gate turn-on delay, the processing circuitry is configured to:

determine to deactivate the synchronous rectification module when the current at the primary side winding is less than a third threshold, the third threshold being less than the first threshold, wherein the synchronous rectification module does not generate the first channel when the synchronous rectification module is deactivated and wherein the synchronous rectification module does not generate the second channel when the synchronous rectification module is deactivated.

4. The controller device of claim 1, wherein, to determine the first synchronous rectification signal and the second synchronous rectification signal, the processing circuitry is configured to:
  determine a maximum gate on-time for the synchronous rectification module using the indication of the current at the primary side winding; and
  generate the first synchronous rectification signal and the second synchronous rectification signal such that an operation time of the activated state of the first synchronous rectification signal is less than the maximum gate on-time and such that an operation time of the activated state of the second synchronous rectification signal is less than the maximum gate on-time.

5. The controller device of claim 4, wherein, to generate the first synchronous rectification signal and the second synchronous rectification signal, the processing circuitry is configured to:
  generate the first synchronous rectification signal and the second synchronous rectification signal such that an operation time of the synchronous rectification module is less than an operation time of the switching module by a predetermined advance delay.

6. The controller device of claim 1, further comprising:
  wherein the switching module comprises a high side switching element configured to electrically couple a first node of the primary side winding to the voltage source during the activated state of the first switching signal and a low side switching element configured to electrically couple the first node of the primary side winding to the reference node during the activated state of the second switching signal, wherein a second node of the primary side winding is coupled to the reference node via a capacitor; and
  wherein the synchronous rectification module comprises a first switching element configured to generate the first channel and a second switching element configured to generate the second channel, the first switching element comprising a body diode that permits current to flow from the first secondary side winding to the load and the second switching element comprising a body diode that permits current to flow from the second secondary side winding to the load.

7. The controller device of claim 1, wherein the indication of the current at the primary side winding is output from capacitive sampling circuitry.

8. A controller device for a resonant converter, the controller device comprising processing circuitry configured to:
  output a first switching signal and a second switching signal to a switching module, the switching module being configured to electrically couple a primary side winding of a transformer to a voltage source during an activated state of the first switching signal and to electrically couple the primary side winding of the transformer to a reference node during an activated state of the second switching signal;
  receive an indication of a current at the primary side winding;
  determine, using the indication of the current at the primary side winding, a first synchronous rectification signal and a second synchronous rectification signal for activating a synchronous rectification module, the synchronous rectification module being configured to generate a first channel for current to flow from a first secondary side winding of the transformer to a load during an activated state of the first synchronous rectification signal and to generate a second channel for current to flow from a second secondary side winding of the transformer to the load during an activated state of the second synchronous rectification signal,
  wherein, to determine the first synchronous rectification signal and the second synchronous rectification signal, the processing circuitry is configured to:
    determine a maximum gate on-time for the synchronous rectification module using the indication of the current at the primary side winding; and
    generate the first synchronous rectification signal and the second synchronous rectification signal such that an operation time of the activated state of the first synchronous rectification signal is less than the maximum gate on-time and such that an operation time of the activated state of the second synchronous rectification signal is less than the maximum gate on-time, and
  wherein, to determine the maximum gate on-time for the synchronous rectification module, the processing circuitry is configured to:
    determine, when the current at the primary side winding reduces, the maximum gate on-time to correspond to a first predetermined value when the current at the primary side winding is less than a first threshold;
    determine, when the current at the primary side winding increases, the maximum gate on-time to correspond to a second predetermined value when the current at the primary side winding is greater than a second threshold, the second threshold being greater than the first threshold;
    determine, when the current at the primary side winding reduces, the maximum gate on-time to correspond to the second predetermined value when the current at the primary side winding is less than a third threshold, the third threshold being greater than the second threshold; and
    determine, when the current at the primary side winding increases, the maximum gate on-time to correspond to the first predetermined value when the current at the primary side winding is greater than a fourth threshold, the fourth threshold being greater than the third threshold; and
  output the first synchronous rectification signal and second synchronous rectification signal to the synchronous rectification module.

9. A controller device for a resonant converter, the controller device comprising processing circuitry configured to:
  output a first switching signal and a second switching signal to a switching module, the switching module being configured to electrically couple a primary side winding of a first transformer to a first voltage source during an activated state of the first switching signal and to electrically couple the primary side winding of the first transformer to a reference node during an activated state of the second switching signal;
  receive an indication of a current at the primary side winding of the first transformer;

determine, using the indication of the current at the primary side winding of the first transformer, a first synchronous rectification signal and a second synchronous rectification signal for activating a synchronous rectification module, the synchronous rectification module being configured to generate a first channel for current to flow from a first secondary side winding of the first transformer to a load during an activated state of the first synchronous rectification signal and to generate a second channel for current to flow from a second secondary side winding of the first transformer to the load during an activated state of the second synchronous rectification signal; and output the first synchronous rectification signal and second synchronous rectification signal to the synchronous rectification module, wherein, to output the first synchronous rectification signal and the second synchronous rectification signal, the processing circuitry is configured to:

output a high side control signal to a first high side switching element and a second high side switching element to couple a first node of a primary side winding of a second transformer to a second voltage source or the reference node; and output a low side control signal to a first low side switching element and a second low side switching element to couple, via a capacitor, a second node of the primary side winding of the second transformer to the second voltage source or the reference node, wherein a driver module is coupled to a secondary side winding of the second transformer and wherein the driver module activates the synchronous rectification module using a signal at the secondary side winding of the second transformer.

10. A method for voltage regulation comprising:

outputting a first switching signal and a second switching signal to a switching module, the switching module being configured to electrically couple a primary side winding of a transformer to a voltage source during an activated state of the first switching signal and to electrically couple the primary side winding of the transformer to a reference node during an activated state of the second switching signal;

receiving an indication of a current at the primary side winding;

determining, using the indication of the current at the primary side winding, a first synchronous rectification signal and a second synchronous rectification signal for activating a synchronous rectification module, the synchronous rectification module being configured to generate a first channel for current to flow from a first secondary side winding of the transformer to a load during an activated state of the first synchronous rectification signal and to generate a second channel for current to flow from a second secondary side winding of the transformer to the load during an activated state of the second synchronous rectification signal, wherein determining the first synchronous rectification signal and second synchronous rectification signal comprises:

determining a gate turn-on delay using the indication of the current at the primary side winding, wherein an edge of the first synchronous rectification signal that activates the activated state of the first synchronous rectification signal is delayed from an edge of the first switching signal that activates the activated state of the first switching signal by the gate turn-on delay and wherein an edge of the second synchronous rectification signal that activates the activated state of the second synchronous rectification signal is delayed from an edge of the second switching signal that activates the activated state of the second switching signal by the gate turn-on delay, and wherein determining the gate turn-on delay comprises:

determining the gate turn-on delay to correspond to a predetermined delay when the current at the primary side winding is less than a first threshold;

determining the gate turn-on delay to correspond to zero when the current at the primary side winding is greater than a second threshold, the second threshold being greater than the first threshold; and determining the gate turn-on delay to correspond to a portion of the predetermined delay when the current at the primary side winding is greater than the first threshold and less than the second threshold; and outputting the first synchronous rectification signal and second synchronous rectification signal to the synchronous rectification module.

11. The method of claim 10, wherein determining the gate turn-on delay to correspond to a portion of the predetermined delay comprises:

determining the portion of the predetermined delay using linear interpolation or a look-up table.

12. The method of claim 10, wherein determining the gate turn-on delay comprises:

determining to deactivate the synchronous rectification module when the current at the primary side winding is less than a third threshold, the third threshold being less than the first threshold, wherein the synchronous rectification module does not generate the first channel when the synchronous rectification module is deactivated and wherein the synchronous rectification module does not generate the second channel when the synchronous rectification module is deactivated.

13. The method of claim 10, wherein determining the first synchronous rectification signal and the second synchronous rectification signal comprises:

determining a maximum gate on-time for the synchronous rectification module using the indication of the current at the primary side winding; and generating the first synchronous rectification signal and the second synchronous rectification signal such that an operation time of the activated state of the first synchronous rectification signal is less than the maximum gate on-time and such that an operation time of the activated state of the second synchronous rectification signal is less than the maximum gate on-time.

14. The method of claim 13, wherein generating the first synchronous rectification signal and the second synchronous rectification signal comprises:

generating the first synchronous rectification signal and the second synchronous rectification signal such that an operation time of the synchronous rectification module is less than an operation time of the switching module by a predetermined advance delay.

15. A method for voltage regulation comprising:

outputting a first switching signal and a second switching signal to a switching module, the switching module being configured to electrically couple a primary side winding of a transformer to a voltage source during an activated state of the first switching signal and to electrically couple the primary side winding of the transformer to a reference node during an activated state of the second switching signal;

receiving an indication of a current at the primary side winding;

determining, using the indication of the current at the primary side winding, a first synchronous rectification signal and a second synchronous rectification signal for activating a synchronous rectification module, the synchronous rectification module being configured to generate a first channel for current to flow from a first secondary side winding of the transformer to a load during an activated state of the first synchronous rectification signal and to generate a second channel for current to flow from a second secondary side winding of the transformer to the load during an activated state of the second synchronous rectification signal, wherein determining the first synchronous rectification signal and the second synchronous rectification signal comprises:

determining a maximum gate on-time for the synchronous rectification module using the indication of the current at the primary side winding; and generating the first synchronous rectification signal and the second synchronous rectification signal such that an operation time of the activated state of the first synchronous rectification signal is less than the maximum gate on-time and such that an operation time of the activated state of the second synchronous rectification signal is less than the maximum gate on-time, and wherein determining the maximum gate on-time comprises:

determining, when the current at the primary side winding reduces, the maximum gate on-time to correspond to a first predetermined value when the current at the primary side winding is less than a first threshold;

determining, when the current at the primary side winding increases, the maximum gate on-time to correspond to a second predetermined value when the current at the primary side winding is greater than a second threshold, the second threshold being greater than the first threshold;

determining, when the current at the primary side winding reduces, the maximum gate on-time to correspond to the second predetermined value when the current at the primary side winding is less than a third threshold, the third threshold being greater than the second threshold; and determining, when the current at the primary side winding increases, the maximum gate on-time to correspond to the first predetermined value when the current at the primary side winding is greater than a fourth threshold, the fourth threshold being greater than the third threshold; and outputting the first synchronous rectification signal and second synchronous rectification signal to the synchronous rectification module.

\* \* \* \* \*